United States Patent
Scott et al.

(10) Patent No.: US 7,032,506 B2
(45) Date of Patent: Apr. 25, 2006

(54) ELECTRIC BEVERAGE MAKER

(75) Inventors: Michael James Scott, Port St. Mary (GB); Steven Ashton, Lonan (GB); Simon Richard Johnston, Port St. Mary (GB)

(73) Assignee: Strix Limited, Ronaldsway (GB)

( * ) Notice: Subject to any disclaimer, the term of this patent is extended or adjusted under 35 U.S.C. 154(b) by 0 days.

(21) Appl. No.: 10/074,990

(22) Filed: Feb. 13, 2002

(65) Prior Publication Data

US 2002/0124735 A1    Sep. 12, 2002

(30) Foreign Application Priority Data

Feb. 14, 2001    (GB) .................................. 0103658

(51) Int. Cl.
*A47J 27/21* (2006.01)
(52) U.S. Cl. .............................. 99/303; 99/281; 99/292
(58) Field of Classification Search .................. 99/281, 99/292, 303, 285, 323.3; 219/436, 437, 438, 219/441, 442, 328, 330, 331
See application file for complete search history.

(56) References Cited

U.S. PATENT DOCUMENTS

| | | | | |
|---|---|---|---|---|
| 1,762,303 A | * | 6/1930 | McBride ...................... | 99/303 |
| 2,345,264 A | * | 3/1944 | Jepson ......................... | 99/292 |
| 3,224,360 A | | 12/1965 | Wickenberg et al. | |
| 3,316,388 A | * | 4/1967 | Wickenberg et al. ......... | 99/292 |
| 3,757,670 A | | 9/1973 | Laama et al. | |
| 4,357,520 A | * | 11/1982 | Taylor ....................... | 99/281 X |
| 4,645,910 A | * | 2/1987 | Chhatwal ................... | 99/281 X |
| 4,704,954 A | * | 11/1987 | Mollenhoff ................... | 99/279 |
| 5,063,838 A | | 11/1991 | Matuschek | |
| 5,699,718 A | * | 12/1997 | Yung et al. .................... | 99/292 |
| 5,782,163 A | * | 7/1998 | Chang .......................... | 99/281 |
| 6,062,127 A | * | 5/2000 | Klosinski et al. ............. | 99/303 |
| 6,536,331 B1 | | 3/2003 | Jorgensen | |
| 2001/0004070 A1 | | 6/2001 | Jorgensen | |
| 2001/0018867 A1 | * | 9/2001 | Jorgensen ..................... | 99/303 |

FOREIGN PATENT DOCUMENTS

| | | |
|---|---|---|
| CH | 384737 | 2/1965 |
| DE | 4441026 | 5/1996 |
| DE | 4441226 A1 | 5/1996 |
| DE | 19914651 A1 | 10/2000 |
| EP | 0904791 A2 | 3/1999 |
| EP | 1233649 | 8/2002 |
| GB | 976.601 | 12/1964 |
| GB | 1368188 | 9/1974 |
| WO | WO 99/48331 | 9/1999 |
| WO | WO 00/45686 | 8/2000 |

OTHER PUBLICATIONS

WO 00/30514 (Taylor et al), Jun. 2, 2000.*

* cited by examiner

*Primary Examiner*—Reginald L. Alexander
(74) *Attorney, Agent, or Firm*—O'Shea, Getz & Kosakowski, P.C.

(57) ABSTRACT

An electric beverage maker includes a lower, water boiling vessel, a funnel extending into the lower vessel and having an upper compartment for receiving a beverage, and an upper vessel mounted over the funnel to receive water which has passed up the funnel through the compartment, and from which the beverage is dispensed. The lower vessel is formed with an opening in its lower region, which is closed by a thick film electric heater. The heater is controlled by a control which operates to disable the heater until such time as the control is reset manually by a user.

39 Claims, 6 Drawing Sheets

ELECTRIC BEVERAGE MAKER

This application is entitled to the benefit of and incorporates by reference essential subject matter disclosed in United Kingdom Patent Application No. 0103658.1 filed on 14 Feb. 2001.

BACKGROUND OF THE INVENTION

1. Technical Field

The present invention relates to electric beverage makers in general, and in particular but not exclusively to electric coffee makers.

2. Background Information

One traditional form of coffee maker is a so-called espresso maker which comprises a lower vessel in which water is heated, a funnel extending into the lower vessel and whose upper part holds coffee grounds, and an upper vessel mounted to the lower vessel and which receives heated water which has passed up the funnel and through the coffee grounds. In use, as water in the lower vessel is heated and boiled, it is forced under pressure up the funnel, through the coffee grounds and a strainer arranged on top of the coffee grounds into the upper vessel, from where it is poured.

Traditionally such coffee makers are of metal and have been heated by being placed on an electric or gas stove. More recently, however, it has been proposed, for example in PCT International Publication No. WO 00/45686, to heat the water in the lower vessel by an integrated electric heater.

DISCLOSURE OF THE INVENTION

The present invention seeks to provide an improved beverage maker of this kind. From a first aspect, therefore, the invention provides an electric beverage maker comprising a lower, water boiling vessel, a funnel extending into the lower vessel and having an upper compartment for receiving a beverage, and an upper vessel mounted over said funnel to receive liquid which has passed up said funnel through said compartment, and from which the beverage is dispensed, characterized in that said lower vessel is formed with an opening in its lower region, and in that an electric heater is mounted to close said opening thereby forming a heating base for the lower vessel.

Thus in accordance with the invention, manufacture of this type of beverage maker is facilitated by providing a heater which can be mounted to close an opening in the heating vessel wall. This is fundamentally different from prior art arrangements in which the heater has, in some way, been integrated in the base of the vessel.

The lower vessel may be metallic, but preferably it is of plastics. This is advantageous in that it considerably simplifies and reduces the cost of manufacture of the beverage maker, allowing the vessel to be molded.

Preferably, the lower vessel has side walls which extend down below the opening so as to form a skirt for shrouding the heater and any associated control. Again, this is a significant advantage over prior art arrangements in which separate shrouds are provided as it means that both the vessel and the shroud can be produced in a single molding operation.

Preferably the upper vessel is molded to further reduce manufacturing costs.

The heater which is arranged in the base of the lower, water heating, vessel may be of any convenient type, for example, a planar heater having heating means provided in, or on, its underside. Such means may comprise a sheathed electric heating element suitably secured to the heating plate, e.g. via a heat diffusion plate, or a cast element (i.e. a heater having a cast-in sheathed heating element). Preferably, however, the heater comprises a thick film printed element.

Preferably the heater is provided with an unheated region thereof which is arranged in use to lie directly beneath the funnel. This is advantageous in that it prevents water directly beneath the funnel from boiling while the bulk of the water is being heated to boiling. The Applicant has recognized that it is undesirable for water beneath the funnel to boil too early as this could cause steam to rise up the funnel and scald the beverage, such as coffee, before it is properly wetted. This applies equally for thick film heaters and for elements mounted under the base of a vessel.

The heater may be secured in the opening in the base of the lower vessel in any convenient manner. For example, the heater may be secured via a peripheral gripping channel, as described in PCT International Publication No. WO 96/18331. Preferably, however, the heater is provided with a peripheral flange which is urged upwardly to secure the heater in place. This is advantageous in that it acts to counteract pressure which is developed in the lower vessel during heating.

Preferably the heater is supported by the housing of an associated control. Most preferably, the arrangement is similar to that shown in FIGS. 1 to 7 of PCT International Publication No. WO 99/48331. These figures show the principle of operation of the Applicant's U36 and U38 series of controls and elements. In particular, a snap acting bimetallic actuator is biased lightly into contact with an associated heater and acts to lift a leaf-spring mounted contact from a corresponding contact provided on the heater in the event of the heater rising above a predetermined temperature. Such a heater/control combination may be used in a beverage maker of the present invention, as it will sense when the liquid in the lower vessel has been boiled away, and then operate to disconnect power to the heating element.

In the arrangement described in PCT International Publication WO 99/48331, the control cycles, i.e. it will reconnect power to the heater after the heater has cooled. In the present invention, however, it is preferable that once the control operates, it does not cycle, but rather disconnects the power until the control is reset by a user. Preferably, therefore, the control used in the appliance of the present invention comprises a thermally sensitive actuator which acts to open a set of contacts when the liquid in the lower vessel has been boiled away, and further comprises means for maintaining those contacts open until such time as reset by a user of the appliance.

This broad concept which will find application in all electric coffee makers of the kind described, so from a further aspect the invention provides an electric beverage maker comprising a lower, water boiling, vessel, a funnel extending into the lower vessel and having an upper compartment for receiving a beverage, an upper vessel mounted over said funnel to receive liquid which has passed up said funnel through said compartment and from which the beverage is dispensed, and electric heating means associated with said lower vessel for heating water in said lower vessel characterized in that said beverage maker further comprises a thermally sensitive control for disconnecting the electrical supply to said heater when the water in said lower vessel substantially boils away, and means for manually resetting said control to allow said heater to be re-energized.

It is also preferred in accordance with this aspect of the invention that the heater is provided with an unheated region arranged directly beneath the funnel.

The control need not take the particular form described above, and in a simple embodiment may comprise a separate thermostatic switch sensitive to the temperature of the heater or vessel base and which will operate when a predetermined temperature is reached. What is important is that the switch should not reset automatically, but should only be resettable by a user.

As described above, the control will usually comprise a thermally sensitive bimetallic actuator. In one embodiment of the invention, the actuator may be of the type which has a reset temperature which is significantly below normal ambient temperatures so that during normal use it will not reset automatically. A suitable mechanism may be provided to reset the mechanism manually when needed.

In another embodiment, the movable contact may be mounted on a bi-stable contact arm which, once it has been moved to its open position can only be returned to its closed position by a manual reset mechanism.

In a further embodiment, the movable contact may be latched open after operation of the bimetallic actuator, and a manual latch release mechanism be provided.

The latch may comprise a catch and a resilient latch member which engages the catch to latch the contact open. The catch may be fixed, but preferably it is associated with the movable contact.

Preferably the resilient latch member comprises an elongate leaf or wire spring, and the latch release mechanism comprises a release member for deflecting said resilient latch member out of engagement with said catch. With such arrangements, the release member is advantageously returned to its original position by the latch member thereby obviating the need for a separate return spring.

A lamp or other indicator may be provided which is illuminated either while the liquid is heating, or after the control has operated, thereby indicating that the beverage is ready.

The heating base of the lower vessel is preferably arranged to slope and the actuator of the control arranged at an upper part of the base.

These and other objects, features, and advantages of the present invention will become apparent in light of the detailed description of the present invention.

BRIEF DESCRIPTION OF THE DRAWINGS

Some preferred embodiments of the invention will now be described with reference to the accompanying drawings in which.

DETAILED DESCRIPTION OF THE INVENTION

Figure 1:
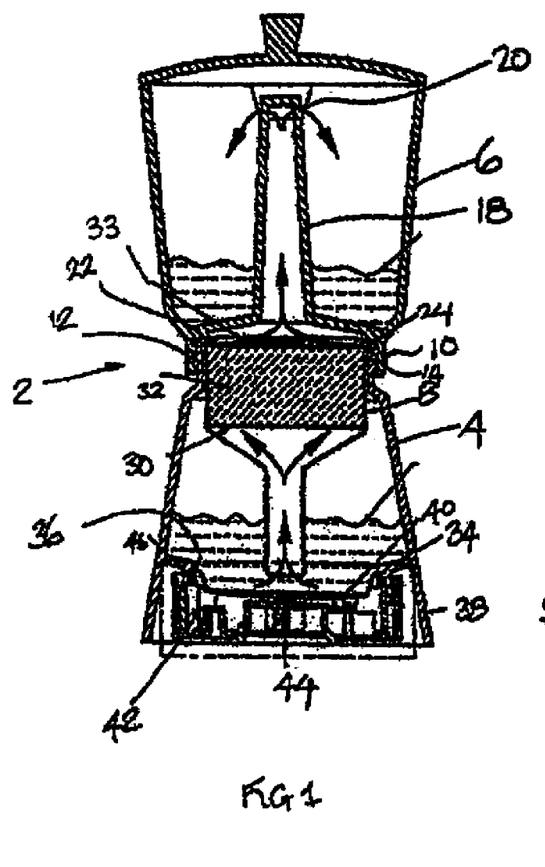
FIG. 1 shows a sectional view through a coffee making appliance in accordance with the invention.
Figure 2:
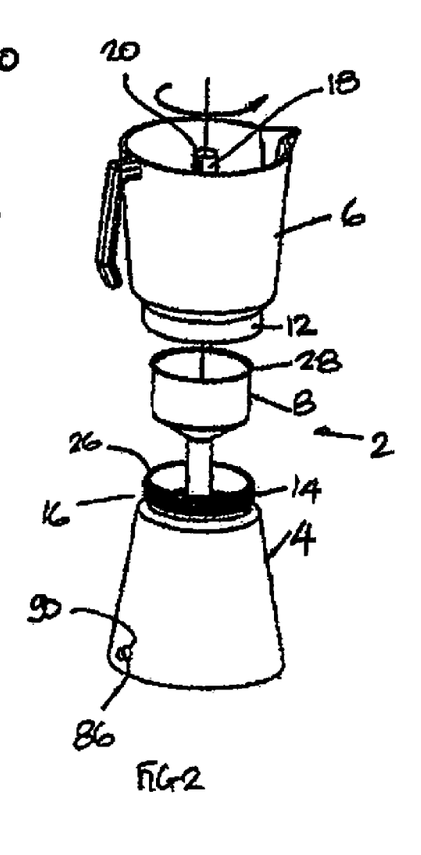
FIG. 2 shows an exploded view of the components of the appliance of FIG. 1.
Figure 3:
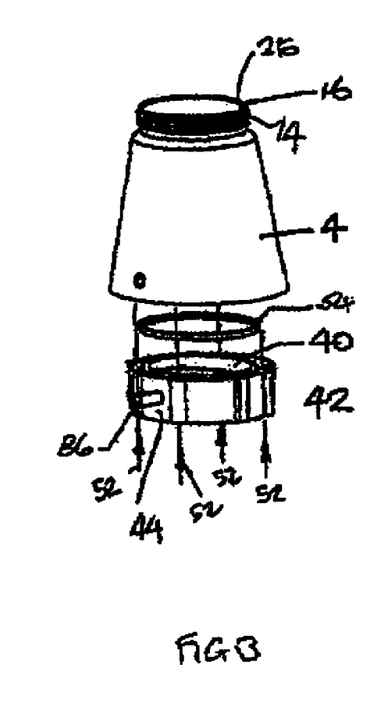
FIG. 3 shows an exploded view of the lower vessel of FIGS. 1 and 2.

With reference to FIGS. 1 to 3, a coffee making appliance 2 in accordance with the invention comprises three main components: a lower, water boiling, vessel 4, an upper beverage receiving vessel 6 and an intermediate funnel 8. The upper and lower vessels 6, 4 are of a molded plastics construction, while the funnel is metallic.

The upper vessel 6 is provided with a skirt 10 provided with an inwardly facing screw thread 12 which engages with a complementary screw thread 14 provided on the upper neck 16 of the lower vessel 4. The upper vessel 6 is also provided with an upwardly extending spout 18 with apertures 20 at its upper and through which boiled water enters the upper vessel 6, as will be discussed further below. The upper vessel 4 is also provided with an inwardly facing flange 22 for receiving a seal 24. As can be seen from FIG. 1, when assembled, the seal 24 is trapped between the flange 24 on the upper vessel 6 and the upper end 26 of the lower vessel 4.

The funnel 8 is provided with a peripheral flange 28, which rests upon the upper edge 26 of the lower vessel 4. A strainer 30 is provided integrally in the funnel 8 for retaining a charge of coffee 32 and a removable filter plate 33 arranged on the top of the charge 32 to prevent grounds being carried into the upper vessel 6.

The lower vessel 4 is provided with an inwardly extending flange 34 towards it lower end, the flange defining a opening 36 in the lower part of the vessel 4. The wall of the lower vessel 4 extends downwardly below the flange 34 to form a skirt 38. A heater 40 is mounted to close the opening 36. A safety pressure valve (not shown) is provided in the wall of the lower vessel 4.

Figure 11:
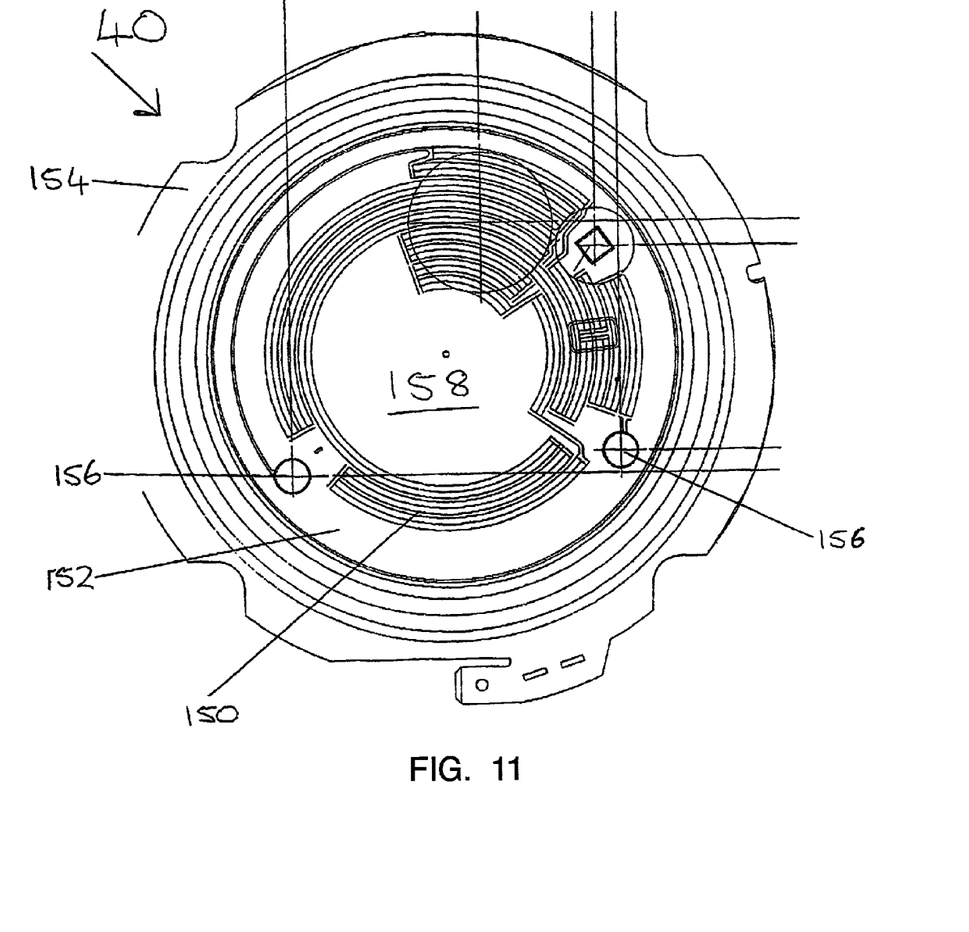
FIG. 11 shows a view of the underside of a thick film electric heater.

The heater 40 is a thick film printed element, and is shown in greater detail in FIG. 11. As is known in the art, the heater 40 comprises a thick film resistive heating track 150, laid on an insulating substrate 152 which is provided on a 0.8 mm thick stainless steel plate. The heating track 150 is terminated by a pair of low resistance contact portions 156. It will also be noted, however, that the resistive track 150 is provided generally only around the periphery of the heating plate. This leaves an unheated area 158 in the center of the heater which is beneath the funnel 8.

The heater 40 is associated with a control unit 42. The control unit 42 is an adaptation of the Applicant's commercially available U36 control which is a thermally-sensitive overheat protection control normally used in kettles and which incorporates a 360° cordless connector 44 for engagement with a corresponding connector on a power base (not shown). The principles of operation of such a control are described in PCT International Publication WO 99/48331.

As can be seen from FIG. 1, the central, planar, part of the heater 40 is arranged to slope in one direction, in fact at about 3° to the horizontal.

Figure 4:
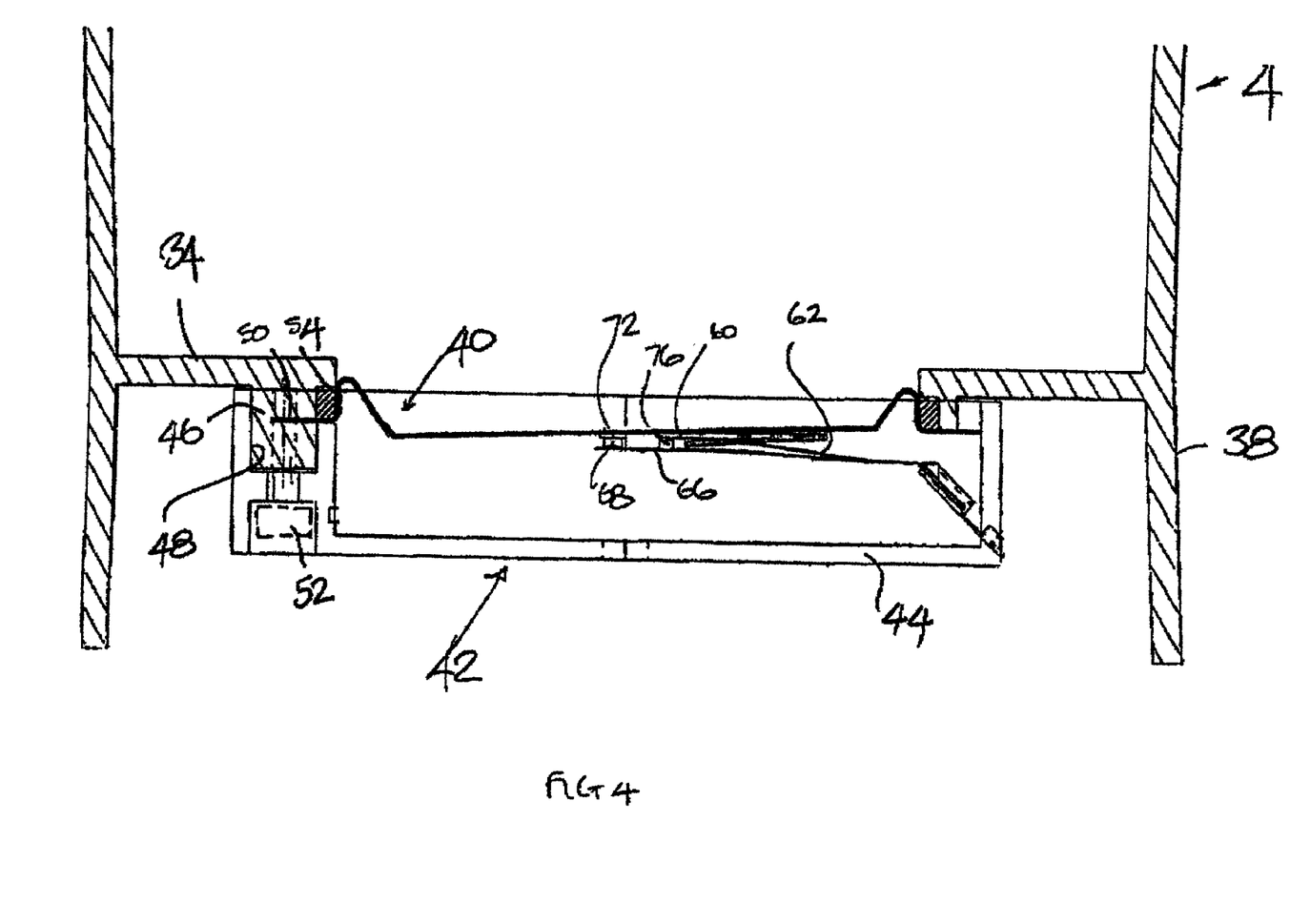
FIG. 4 shows, schematically, the mounting arrangement and various operative components of the control of the appliance of FIGS. 1 to 3.

As shown schematically in FIG. 4, the control 42 includes a molded control body 42, which receives the heater 40, clips (not shown) being provided around the inner periphery of the control molding 44 to hold the heater 40 in place on the control unit prior to its assembly into the appliance. The flange 34 of the vessel body 4 is provided with a number of bosses 46 which extend into bores 48 provided in the molding 44, the peripheral flange 50 of the heater being scalloped in the region of these bores in order to allow for the passage of respective fixing screws 52. A seal 54 is provided around the flange 50 of the heater, and when the control 42 and heater 40 are mounted to the vessel body 4 as a subassembly, the seal 54 is compressed against the flange 34 to make a water-tight seal around the heater 40 to prevent water entering the control 42.

Figure 5:
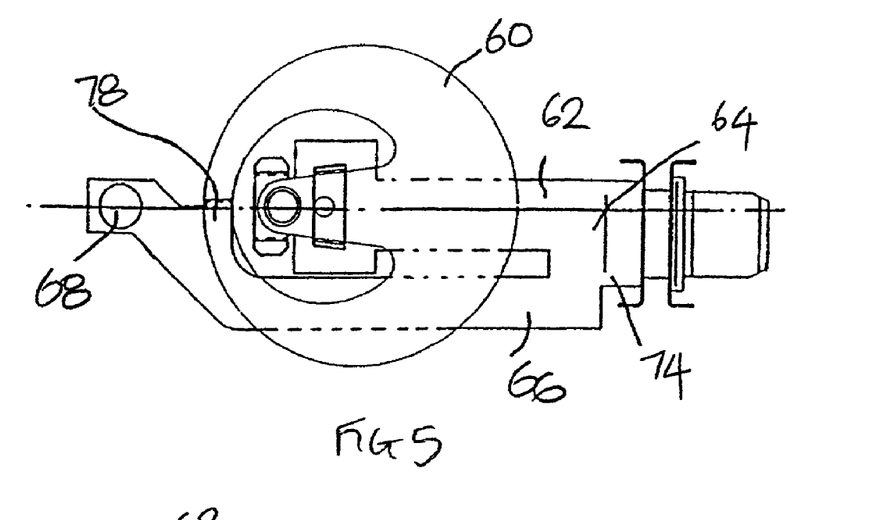
FIG. 5 shows the actuator and contact arrangement of FIG. 4 in plan view.

As shown schematically in FIGS. 4 and 5, the control comprises a thermally sensitive bimetallic actuator 60 mounted on one arm 62 of a generally U-shaped leaf spring member 64. The other arm 66 of the member is provided at its free end with a contact 68 which makes electrical connection with a contact 72 provided on the heater 40. The cross limb 74 of the member 64 is connected to one side of the electrical supply to the control, e.g. being connected to the line or neutral terminal of the connector 44. A tongue 76 is upstanding from the arm 66 so as to underlie a peripheral region 78 of the actuator 60 whereby when the actuator operates it will push down the arm 66 and thereby open the set of contacts 70, 72.

In a conventional kettle, the actuator 60 will detect overheating of the kettle, for example when it boils dry or it is turned on without any water in it. In the context of the present invention, however, boiling dry of the lower vessel 4 will indicate that all, or a substantial part of, the water has been evaporated from the lower vessel 4 and that the heater 40 can then be turned off. In fact, the actuator 60 is arranged under an upper part of the sloping heater 40 such that that part of the heater 40 becomes exposed before all the liquid has evaporated away. This is advantageous in helping ensure that the periphery of the heater 40 and the surrounding vessel body does not overheat.

The conventional U36 control is configured such that it will cycle, i.e. it will allow the contacts 70, 72 to reclose after the heater 40 has cooled. However, this is not desirable in the case of the present invention. Accordingly, a mechanism is provided whereby once the actuator 60 operates to open the contact 70, 72 the contacts will be held open.

Figure 6:
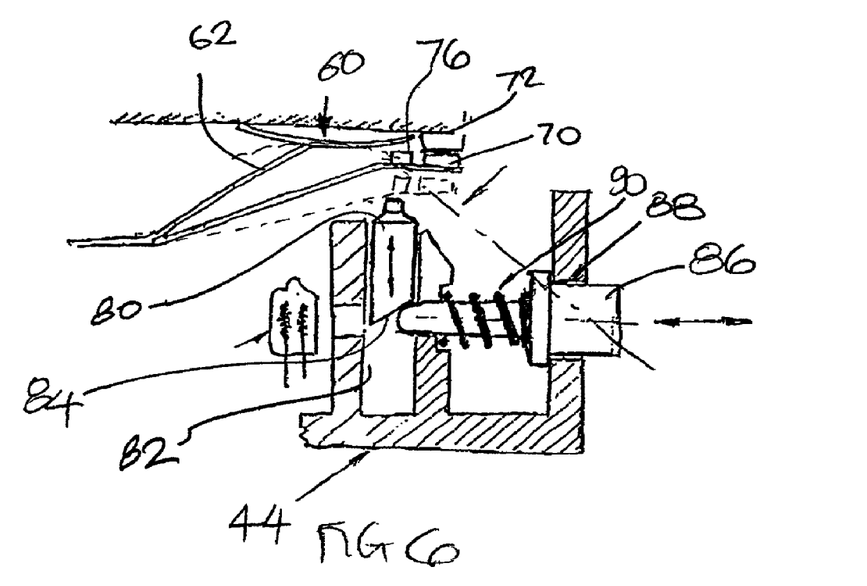
FIG. 6 illustrates, schematically, a first react mechanism.

A number of different mechanisms to achieve this are disclosed herein. In a first arrangement, shown in FIG. 6, the bimetallic actuator 60 is chosen such that it is a non-self resetting actuator, i.e. the actuator 60 will only revert to its original position (and thus allow re-energization of the appliance heater) after operation either when the temperature falls significantly below ambient temperature or when it is physically reset by a user. A reset mechanism suitable for this purpose is shown in FIG. 6.

In this embodiment, a reset plunger 80 is mounted in a bore 82 in the control molding 44. The lower end 84 of the plunger 60 is angled and rests upon a spring loaded button 86 which extends through an aperture 88 in the side wall of the molding 44 and also through an aperture 90 in the skirt 38 of the lower vessel 4. When it is desired to reset the control after it has operated (in which situation the components will assume the positions shown in phantom in FIG. 6), the button 86 is pressed inwardly, causing the plunger 80 to move upwardly under a camming action so as to contact the periphery of the actuator 60 and so force it to return to its original configuration, thereby allowing the contacts 70, 72 to reclose. When the button 86 is released, it returns to its original position under the action of the spring 90 and the plunger 80 will return to its original position under its own weight.

Figure 7:
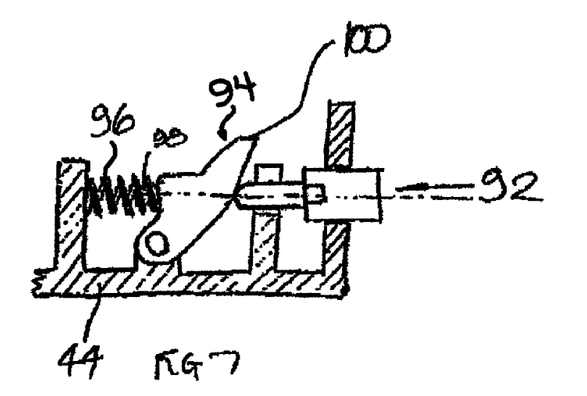
FIG. 7 shows a second reset mechanism.

An alternative mechanism is shown in FIG. 7. In this embodiment, the reset button 92 acts on a lever arm 94 which is pivotally mounted to the molding 44. A spring 96 is arranged on a spigot 98 provided on the lever 94 to provide a return force on the button 92. When the button 92 is pressed, the lever 94 will rotate anti-clockwise such that its free end 100 will engage the periphery of the actuator 60 in order to force it back towards its original position.

Figure 8:
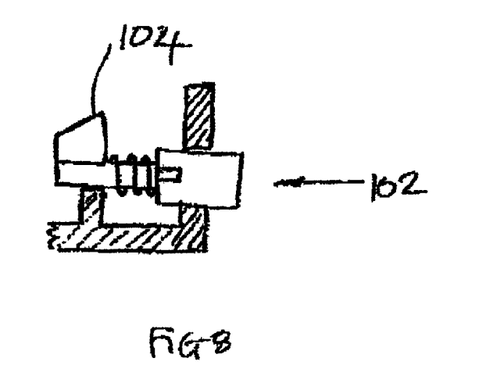
FIG. 8 shows a third reset mechanism.

In a yet further embodiment, shown in FIG. 8, a spring loaded button 102 is provided with a cam surface 104 at its free end such that when the button 102 is pressed the upper most part of the cam surface 104 moves into contact with the periphery of the actuator 60 in order to reset it.

Figure 9:
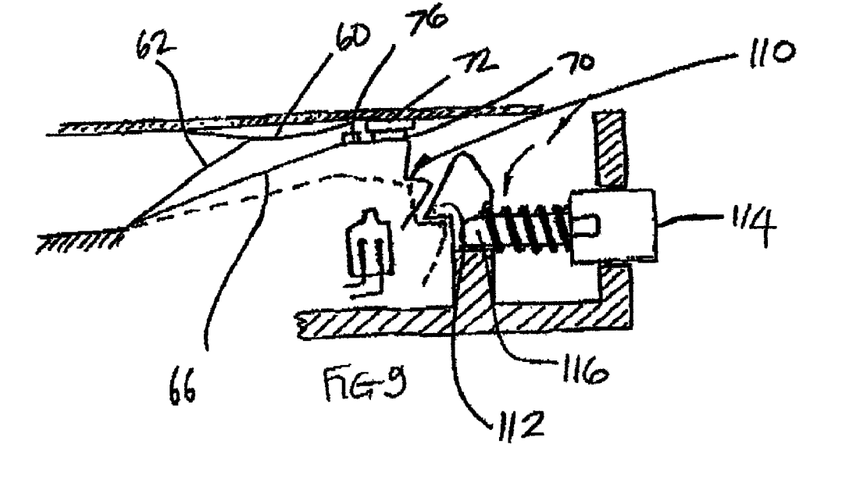
FIG. 9 shows a further reset mechanism for use in an appliance in accordance with the invention.

Other reset mechanisms are also envisaged. A further embodiment is shown schematically in FIG. 9. In this embodiment, the actuator 60 is, instead, a conventional auto-resetting actuator which will return to its original configuration after cooling to a temperature around or above ambient. In this arrangement, however, the end of the contact carrying arm 66 is provided with a latch 110 which, when the contacts 70, 72 are opened under the action of the actuator 60, engages behind a catch 112 provided on the control molding 44 to retain the contacts 70, 72 open even after the actuator 60 has returned to its original configuration. When the spring loaded reset button 114 is pressed, the latch 110 is disengaged by the free end 116 of the button 114 bending the resilient arm 66 back to disengage the latch 110 from under the catch surface 102, thereby allowing the contacts to return to their closed position.

Figure 10:
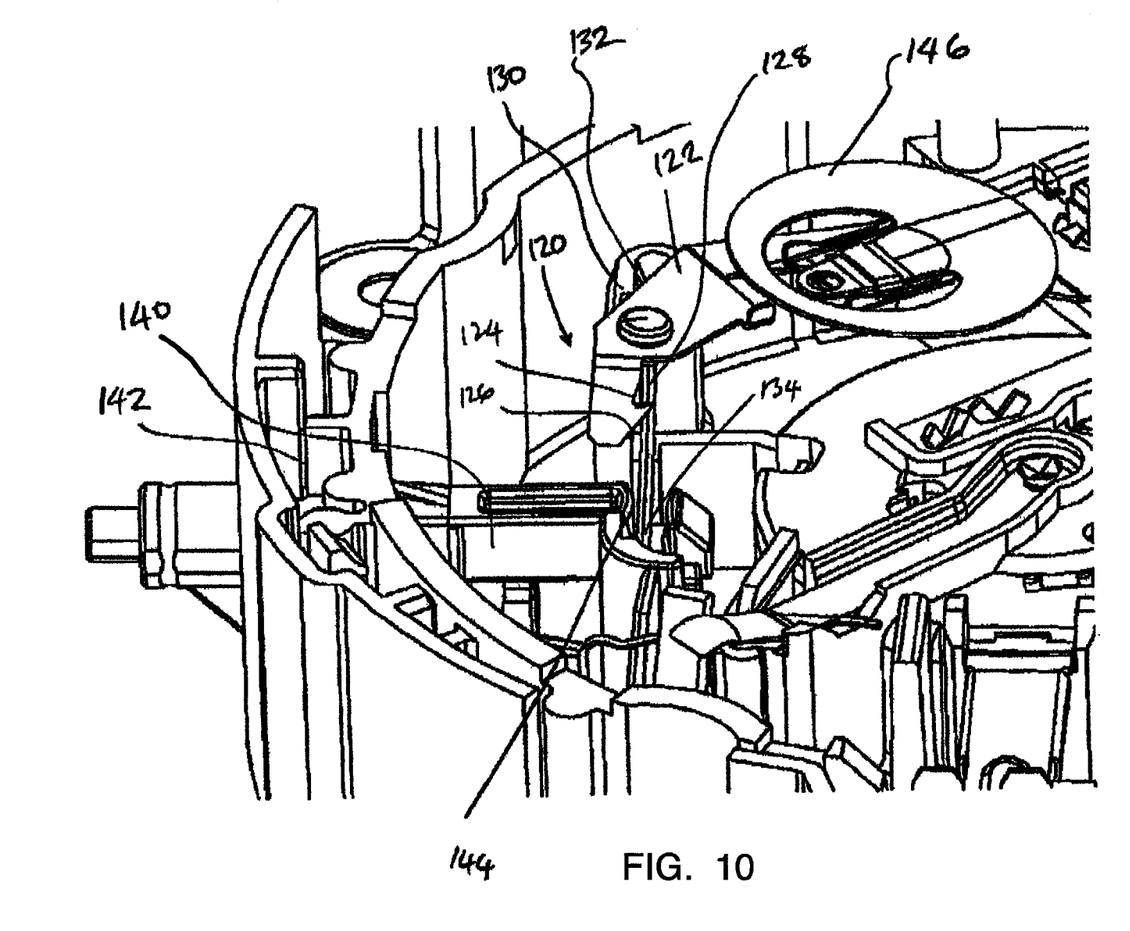
FIG. 10 shows a yet further reset mechanism in accordance with the invention.

In a further, similar, arrangement shown in FIG. 10, the end 120 of the contact carrying arm 122 is provided with a depending catch 124. The lower edge 126 of the catch 124 is sloped, as shown.

A wire spring 128 which is fixed in the control housing 130 at one end 132 extends across the control housing 130 below the sloped edge 126 of the catch 124. The other end 134 of the spring 128 is free to deflect.

A button 140 extends through the wall 142 of the control housing 130 and has a free end 144 which in its rest position is abutted by the spring 128.

When the bimetallic actuator 146 operates it will move contact arm 122 downwardly causing the sloping edge 126 of the catch 124 to engage the spring 128 and push it to one side until the contact arm 122 has fully deflected, whereupon the spring 128 will move back under its own resilience to engage the catch 124 thereby preventing the contact arm 122 returning to its rest position even after the bimetallic actuator 146 has reset. To reset the contact arm 122, the button 140 must be pressed in to deflect the spring 128 out of the catch 124. After it has disengaged, the spring 128 will act to return the button to its rest position.

Operation of an appliance in accordance with the invention will now briefly be described. Firstly, a desired volume of water is placed in the lower vessel 4. This volume can be pre-measured or gauged from volumetric marks (not shown) provided on the inside of the vessel wall.

The funnel 8 is then filled with coffee grounds 32 (or other foodstuffs) until it is level with the rim and the strainer filter plate 34 used to tamp down the coffee. It is then rested on the top of the grounds 32. If desired, a false floor can be placed in the funnel 8 before filling to take up some of the volume, whereby the amount of coffee or other foodstuff can be varied in order to vary the strength or the volume of the beverage produced.

The funnel 8 is then placed in position on the lower vessel 4 and the upper vessel 6, which carries the seal 22, then screwed onto the upper end 16 of the lower vessel 4 so as to seal the lower vessel 4. The whole appliance is then placed on its power base (not shown) and the reset button 86 etc pressed to supply power to the heater 40.

The water in the lower vessel 4 is then heated to a point where steam vapor is generated which creates a pressure in the lower vessel 4. This forces the water from the lower vessel 4 up through the funnel 8, through the coffee grounds 32, where it infuses with the coffee, up the spout 18 and out of the apertures 20 formed in the spout 18 of the upper vessel 6. By virtue of the unheated area 158 beneath the funnel 8, water directly below the funnel 8 does not boil during the bulk water heat-up phase. This prevents the coffee grounds 32 being scalded by steam until properly wet. This improves the flavor of the brewed coffee.

Once the majority of the water has been pushed out of the lower vessel 4 through the funnel 8, the temperature of the heater 40 will begin to rise, and this rise will be detected by the actuator 60 of the control 42. In particular, the actuator 60 of the control will operate to open the contact 70, 72 thereby disconnecting the power supply to the heater 40 when the area of the heater 40 under which it is arranged boils dry. The contact 70, 72 are then maintained open by one of the various mechanisms described in FIGS. 6 to 10 in order to stop the heater 40 re-energizing.

The appliance can then be lifted and the beverage dispensed from the upper vessel 6, whereafter the upper vessel 6 may be unscrewed from the lower vessel 4, the funnel 8 removed and the appliance cleaned. The process will then be repeated to prepare a new beverage, the act of pressing the reset button 86 allowing the contacts 70, 72 to reclose in order to supply power once more to the heater 36.

It will be appreciated that various modifications can be made to the preferred embodiments of the invention described above without departing from the scope of the invention. For example, controls other than those specifically described may be used, so long as they detect overheating of the heated base vessel. Furthermore, other latching mechanisms may be envisaged for holding open the contacts of a control upon operation. Furthermore, the invention is not limited to the use of thick film printed elements, but can be used with electric heating elements suitably mounted under the base of the vessel. Also, the appliance need not be cordless, as shown and the appliance may be adapted to make other beverages such as soup.

Although this invention has been shown and described with respect to the detailed embodiments thereof, it will be understood by those skilled in the art that various changes in form and detail thereof may be made without departing from the spirit and scope of the invention.

What is claimed is:

1. An electric beverage maker comprising a lower, water boiling vessel, a funnel extending into the lower vessel and having an upper compartment for receiving a beverage and an upper vessel mounted over said funnel to receive water which has passed up said funnel through said compartment, and from which the beverage is dispensed, said lower vessel being formed with an opening in its lower region, and an electric heater being mounted to close said opening thereby forming a heating base for the lower vessel, wherein said heater comprises an unheated region arranged directly below said funnel.

2. A beverage maker as claimed in claim 1 wherein the lower vessel is made of plastics.

3. A beverage maker as claimed in claim 2 wherein the lower vessel has side walls which extend down below the opening so as to form a skirt.

4. A beverage maker as claimed in claim 1 wherein the upper vessel is molded plastics.

5. A beverage maker as claimed in claim 1 wherein the heater, which is arranged in the base of the lower vessel, is a planar heater having heating means provided in or on its underside.

6. A beverage maker as claimed in claim 5 wherein the heater is provided with a peripheral flange which is urged upwardly to secure the heater in place.

7. A beverage maker as claimed in claim 6 wherein said flange is urged upwardly by the housing of a control for the beverage maker.

8. A beverage maker as claimed in claim 1 further comprising a thermally sensitive control operable to disconnect the power supply to the heater when at least a part of said lower vessel boils dry.

9. A beverage maker as claimed in claim 8 wherein the control is arranged such that it disconnects the power to the heater until the control is reset by a user.

10. A beverage maker as claimed in claim 9 wherein said control comprises a thermally sensitive actuator operable to open a set of contacts when the liquid in at least a part of said lower vessel has been boiled away, and further comprises means for maintaining those contacts open until such time as reset by a user of the appliance.

11. A beverage maker as claimed in claim 10 wherein said actuator is a thermally sensitive bimetallic actuator of the type which has a reset temperature which is significantly below normal ambient temperatures whereby it may only be reset by a user in normal use.

12. A beverage maker as claimed in claim 10 wherein a movable contact is mounted on a bi-stable contact arm which, once it has been moved to its open position, can only be returned to its closed position by a manual reset mechanism.

13. A beverage maker as claimed in claim 10 further comprising a latch for latching a movable contact in an open condition after operation of the bimetallic actuator, and a manual latch release mechanism.

14. A beverage maker as claimed in claim 13 wherein the latch comprises a catch and a resilient latch member which engages the catch to latch the contact open.

15. A beverage maker as claimed in claim 14 wherein said latch release mechanism comprises a release member for deflecting said resilient latch member out of engagement with said catch.

16. A beverage maker as claimed in claim 14 wherein the catch is associated with the movable contact.

17. A beverage maker as claimed in claim 16 wherein said latch release mechanism comprises a release member for deflecting said resilient latch member out of engagement with said catch.

18. A beverage maker as claimed in claim 16 wherein said resilient latch member comprises an elongate leaf or wire spring.

19. A beverage maker as claimed in claim 18 wherein said latch release mechanism comprises a release member for deflecting said resilient latch member out of engagement with said catch.

20. A beverage maker as claimed in claim 1 comprising a lamp or other indicator which is illuminated either while the liquid is heating, or after the control has operated, thereby indicating that the beverage is ready.

21. An electric beverage maker comprising a lower, water boiling, vessel, a funnel extending into the lower vessel and having an upper compartment for receiving a beverage, an upper vessel mounted over said funnel to receive water which has passed up said funnel through said compartment and from which the beverage is dispensed, and electric heating means associated with said lower vessel for heating water in said lower vessel, said beverage maker further comprising a thermally sensitive control for disconnecting the electrical supply to said heater when the water in said lower vessel substantially boils away, and means for manually resetting said control to allow said heater to be re-energized, wherein said heater comprises an unheated region arranged directly below said funnel.

22. A beverage maker as claimed in claim 21 wherein said control comprises a thermally sensitive actuator operable to open a set of contacts when the liquid in at least a part of said lower vessel has been boiled away, and further comprises means for maintaining those contacts open until such time as reset by a user of the appliance.

23. A beverage maker as claimed in claim 22 wherein said actuator is a thermally sensitive bimetallic actuator of the type which has a reset temperature which is significantly below normal ambient temperatures whereby it may only be reset by a user in normal use.

24. A beverage maker as claimed in claim 22 wherein a movable contact is mounted on a bi-stable contact arm which, once it has been moved to its open position, can only be returned to its closed position by a manual reset mechanism.

25. A beverage maker as claimed in claim 22 further comprising a latch for latching a movable contact in an open condition after operation of the bimetallic actuator, and a manual latch release mechanism.

26. A beverage maker as claimed in claim 25 wherein the latch comprises a catch and a resilient latch member which engages the catch to latch the contact open.

27. A beverage maker as claimed in claim 26 wherein the catch is associated with the movable contact.

28. A beverage maker as claimed in claim 27 wherein said resilient latch member comprises an elongate leaf or wire spring.

29. An electric beverage maker comprising a lower, water boiling vessel, a funnel extending into the lower vessel and having an upper compartment for receiving a beverage and an upper vessel mounted over said funnel to receive water which has passed up said funnel through said compartment, and from which the beverage is dispensed, characterized in that said lower vessel is formed with an opening in its lower region, and in that opening an electric heater is mounted to close said opening thereby forming a heating base for the lower vessel, and wherein the heating base of the lower vessel is arranged to slope and the actuator of a control is arranged at an upper part of the base.

30. A thermally sensitive control for an electric beverage maker comprising a lower, water boiling, vessel, a funnel extending into the lower vessel and having an upper compartment for receiving a beverage, an upper vessel mounted over said funnel to receive water which has passed up said funnel through said compartment and from which the beverage is dispensed, and electric heating means associated with said lower vessel for heating water in said lower vessel, wherein said lower vessel comprises an unheated region arranged directly below said funnel, said control comprising a thermally sensitive actuator operable to open a set of contacts when the liquid in at least a part of said lower vessel has been boiled away, a latch for latching a movable contact in an open condition after operation of the bimetallic actuator, and a manual latch release mechanism.

31. A control as claimed in claim 30 wherein the latch comprises a catch and a resilient latch member which engages the catch to latch the contact open.

32. A control as claimed in claim 31 wherein said latch release mechanism comprises a release member for deflecting said resilient latch member out of engagement with said catch.

33. A control as claimed in claim 31 wherein the catch is associated with the movable contact.

34. A control as claimed in claim 33 wherein said latch release mechanism comprises a release member for deflecting said resilient latch member out of engagement with said catch.

35. A control as claimed in claim 31 wherein said resilient latch member comprises an elongate leaf or wire spring.

36. A control as claimed in claim 35 wherein said latch release mechanism comprises a release member for deflecting said resilient latch member out of engagement with said catch.

37. An electric beverage maker comprising a liquid heating vessel, a funnel extending into the vessel, and an electric heater for heating liquid in the vessel,
wherein the funnel includes a first open end and a second open end, and the second open end is smaller in cross-sectional area than the first open end, and
wherein the electric heater includes a stainless steel plate and a heating element disposed only around the periphery of the plate, and wherein the electric heater has a first portion disposed within the periphery of the plate, directly below all of the second open end of the funnel, and the first portion of the electric heater is unheated.

38. The electric beverage maker of claim 37, wherein the heating element is a thick film heating element.

39. The electric beverage maker of claim 37, wherein the heating element is a sheathed electric heating element.

* * * * *

(12) EX PARTE REEXAMINATION CERTIFICATE (6666th)
United States Patent
Scott et al.

(10) Number: US 7,032,506 C1
(45) Certificate Issued: Feb. 17, 2009

(54) ELECTRIC BEVERAGE MAKER

(75) Inventors: Michael James Scott, Port St. Mary (GB); Steven Ashton, Lonan (GB); Simon Richard Johnston, Port St. Mary (GB)

(73) Assignee: Strix Limited, Ronaldsway (IM)

Reexamination Request:
No. 90/008,407, Dec. 29, 2006

Reexamination Certificate for:
Patent No.: 7,032,506
Issued: Apr. 25, 2006
Appl. No.: 10/074,990
Filed: Feb. 13, 2002

(30) Foreign Application Priority Data

Feb. 14, 2001 (GB) ................................ 0103658

(51) Int. Cl.
*A47J 27/21* (2006.01)

(52) U.S. Cl. ................. 99/303; 99/281; 99/292
(58) Field of Classification Search ........... None
See application file for complete search history.

(56) References Cited

U.S. PATENT DOCUMENTS

| | | | |
|---|---|---|---|
| 3,757,670 A | 9/1973 | Laama et al. | |
| 4,118,683 A | 10/1978 | Schwarz | |
| 4,888,466 A | 12/1989 | Hoffmann | |
| 5,046,409 A | 9/1991 | Henn | |
| 2001/0004070 A1 | 6/2001 | Joergensen | |

FOREIGN PATENT DOCUMENTS

| | | | |
|---|---|---|---|
| DE | 199 14 651 A1 | | 10/2000 |
| EP | WO9618331 | * | 6/1996 |
| EP | 0 787 452 A1 | | 8/1997 |
| WO | WO 98/36618 | | 8/1998 |
| WO | WO 99/48331 | | 9/1999 |
| WO | WO 99/54903 | | 10/1999 |
| WO | WO 00/30514 | | 6/2000 |

* cited by examiner

*Primary Examiner*—Krisanne Jastrzab (57) ABSTRACT

An electric beverage maker includes a lower, water boiling vessel, a funnel extending into the lower vessel and having an upper compartment for receiving a beverage, and an upper vessel mounted over the funnel to receive water which has passed up the funnel through the compartment, and from which the beverage is dispensed. The lower vessel is formed with an opening in its lower region, which is closed by a thick film electric heater. The heater is controlled by a control which operates to disable the heater until such time as the control is reset manually by a user.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–39 are cancelled.

* * * * *